(12) United States Patent
Mori et al.

(10) Patent No.: US 10,351,323 B2
(45) Date of Patent: Jul. 16, 2019

(54) PACKAGE BAG AND METHOD FOR PRODUCING SAME

(71) Applicant: Fujimori Kogyo Co., Ltd., Tokyo (JP)

(72) Inventors: Toshihiko Mori, Yokohama (JP); Tomoko Kubota, Yokohama (JP); Yasuharu Takada, Tokyo (JP)

(73) Assignee: Fujimori Kogyo Co., Ltd. (JP)

( * ) Notice: Subject to any disclaimer, the term of this patent is extended or adjusted under 35 U.S.C. 154(b) by 291 days.

(21) Appl. No.: 15/351,033

(22) Filed: Nov. 14, 2016

(65) Prior Publication Data

US 2017/0057723 A1    Mar. 2, 2017

Related U.S. Application Data

(62) Division of application No. 13/882,081, filed as application No. PCT/JP2010/072649 on Dec. 16, 2010, now abandoned.

(51) Int. Cl.
*B65D 75/58* (2006.01)
*B65D 75/00* (2006.01)
(Continued)

(52) U.S. Cl.
CPC ......... *B65D 75/5822* (2013.01); *B29D 22/00* (2013.01); *B29D 22/003* (2013.01);
(Continued)

(58) Field of Classification Search
CPC  B65D 75/5822; B65D 75/008; B29D 22/003; B29D 22/00; B31B 70/857;
(Continued)

(56) References Cited

U.S. PATENT DOCUMENTS 3,779,420 A    12/1973  Knaus
4,498,591 A     2/1985  Smith, II
(Continued)

FOREIGN PATENT DOCUMENTS

EP    1908697 A1    4/2008
EP    2052988 A1    4/2009
(Continued)

OTHER PUBLICATIONS

Translation of JP 2008-74479 A (Originally published on Apr. 3, 2008), Retrieved on IP.com.*
(Continued)

*Primary Examiner* — Nathan L Van Sell
(74) *Attorney, Agent, or Firm* — St. Onge Steward Johnston & Reens, LLC

(57) ABSTRACT

A manufacturing method of a package bag (10) according to the present invention includes: a cured portion forming step of forming a cured portion (15*a*, 15*b*) on at least one side of a forming position of a rib (14) by crystallizing at least a portion of a resin constituting a film (11) by heating and cooling the film (11); and a rib forming step of forming a rib (14) by pressing the film (11) using concave and convex molds. According to the present invention, it is possible to maintain an opening state of a spout (12). Further, since additional material is not required, it is possible to suppress increase in the thickness of the package bag (10) and to reduce the bulkiness of the package bags.

10 Claims, 8 Drawing Sheets

(51) Int. Cl.
    *B31B 70/855*     (2017.01)
    *B31B 70/00*     (2017.01)
    *B31B 160/20*     (2017.01)
    *B31B 155/00*     (2017.01)
    *B29L 9/00*     (2006.01)
    *B29D 22/00*     (2006.01)

(52) U.S. Cl.
    CPC .... *B65D 75/008* (2013.01); *B29K 2995/0041* (2013.01); *B29L 2009/00* (2013.01); *B31B 70/252* (2017.08); *B31B 70/857* (2017.08); *B31B 2155/00* (2017.08); *B31B 2155/002* (2017.08); *B31B 2160/20* (2017.08)

(58) Field of Classification Search
    CPC .............. B31B 2155/00; B31B 70/252; B31B 2160/20; B31B 2155/002; B29L 2009/00; B29K 2995/0041
See application file for complete search history.

(56) References Cited

U.S. PATENT DOCUMENTS

| | | | |
|---|---|---|---|
| 4,717,046 A | | 1/1988 | Brogli |
| 5,156,295 A | * | 10/1992 | Gordon ............... B65D 77/065 220/712 |
| 5,312,189 A | | 5/1994 | Aeschbach et al. |
| 6,667,081 B1 | | 12/2003 | Aoki et al. |
| 8,048,093 B2 | * | 11/2011 | Mapes ........... A61B 17/320725 606/159 |
| 8,070,016 B2 | | 12/2011 | Kawakami et al. |
| 8,381,948 B1 | | 2/2013 | Jian et al. |
| 8,485,400 B2 | | 7/2013 | Kawakami et al. |
| 2005/0230877 A1 | * | 10/2005 | Readdy ..................... B24C 1/06 264/219 |
| 2011/0042864 A1 | * | 2/2011 | Naef ....................... A61F 5/003 264/503 |

FOREIGN PATENT DOCUMENTS

| | | |
|---|---|---|
| JP | 03098856 A | 4/1991 |
| JP | 07002260 A | 1/1995 |
| JP | 11011498 A | 1/1999 |
| JP | 11059704 A | 3/1999 |
| JP | 11314652 A | 11/1999 |
| JP | 2000238803 A | 9/2000 |
| JP | 2000343603 A | 12/2000 |
| JP | 2002144512 A | 5/2002 |
| JP | 2002179084 A | 6/2002 |
| JP | 2003267404 A | 9/2003 |
| JP | 2003291992 A | 10/2003 |
| JP | 2004338753 A | 12/2004 |
| JP | 2005067630 A | 3/2005 |
| JP | 2005187046 A | 7/2005 |
| JP | 2005187080 A | 7/2005 |
| JP | 2006027721 A | 2/2006 |
| JP | 2007223059 A | 9/2007 |
| JP | 2007276837 A | 10/2007 |
| JP | 2008074479 A | 4/2008 |
| JP | 2009023694 A | 2/2009 |
| JP | 2010173689 A | 8/2010 |
| JP | 2011006115 A | 1/2011 |

OTHER PUBLICATIONS

Translation of JP 2002-179084 A (Originally published on Jun. 26, 2002), Retrieved on IP.com.*
European Search Report Application No. EP 10 86 0733.4 Completed: Apr. 10, 2014; dated Apr. 22, 2014 4 pages.
International Search Report Application No. PCT/JP2010/072649 Date of Completion: Feb. 1, 2011; dated Feb. 15, 2011 5 pages.
Notice of Allowance Application No. 2009-152130 dated Oct. 29, 2013 6 pages.
Notice of Reasons for Rejection Application No. 2012-548581 dated Jul. 15, 2014 6 pages.
Notice of Reasons for Rejection Application No. 2009-152130 dated Jul. 3, 2012 7 pages.

* cited by examiner

PACKAGE BAG AND METHOD FOR PRODUCING SAME

TECHNICAL FIELD

The present invention relates to a package bag having a spout which is defined by a pair of flow passage forming sealing portions which are formed by sealing two films at both side portions of a flow passage, and a manufacturing method thereof.

BACKGROUND ART

A package bag provided with a spout has been widely used as, for example, a package bag which accommodates contents for refill, in order to easily discharge the contents therefrom.

Patent Document 1 discloses a bag having a reinforcement mechanism constituted by two linear deformations which are formed by performing deformation processing on a film, in order to prevent bending of a spout portion.

Patent Document 2 discloses a package bag provided with a reinforcement layer formed on a base material having a flow passage introduction portion of a spout, a flow passage of the spout, and the like, by applying curable resin to the base material, or by adhering a reinforcement piece to the base material.

Patent Document 3 discloses a pouch container having: a planar protruding processed portion which is formed in a region where an opening cutting line is disposed; and a protruding processed portion which protrudes outward from a wall of the pouch, such as a first linear protruding processed portion which is formed in a center line direction, second linear protruding processed portions which are formed in both sides of the first protruding processed portion along the first protruding processed portion, and a third linear protruding processed portion which is formed in a direction intersecting the center line.

CITATION LIST

Patent Document

Patent Document 1: Japanese Unexamined Patent Application, First Publication No. H7-2260
Patent Document 2: Japanese Unexamined Patent Application, First Publication No. 2004-338753
Patent Document 3: Japanese Unexamined Patent Application, First Publication No. 2007-276837

SUMMARY OF INVENTION

Technical Problem

The package bag disclosed in Patent Document 1 does not require additional materials used for improving the spout efficiency. However, the opening degree of the spout changes depending on the flow amount of the contents which passes through the spout. Therefore, if the residual amount of the contents decreases, the flow amount of the passing contents also decreases, and it thereby becomes difficult to maintain the opening state of the spout. Specially, in the case of a large-sized package bag for business use, compared with a small-sized package bag for home use, a package bag capable of maintaining the opening state of the spout until almost no residual liquid remains is desired from the viewpoint of a reduction of cost associated with loss of the residual liquid or working time.

Further, if the reinforcement layer is separately provided as is disclosed in Patent Document 2 or many protruding processed portions are provided as is disclosed in Patent Document 3, since the thickness of the package bag increases, the package bags when the empty bags are boxed becomes bulky.

The present invention was devised in view of the above circumstances, and has as an object the provision of a package bag which can easily maintain an opening state of a spout and which can suppress increase in the thickness of the package bag and reduce the bulkiness of the package bags even when the spout is reinforced, and a manufacturing method thereof.

Solution to Problem

In order to achieve the above-described objet, the present invention adopts the following means.

The present invention provides a manufacturing method of a package bag including: a spout defined by a pair of flow passage forming sealing portions which are formed by sealing two films at both side portions of a flow passage; a groove rib formed so as to protrude outward of the film and extend along the flow passage; and a cured portion formed on at least one side of the rib by crystallizing at least a portion of a resin constituting the film, and the manufacturing method including: a cured portion forming step of forming the cured portion on at least one side of a forming position of the rib by crystallizing at least the portion of the resin constituting the film by heating and cooling the film; and a rib forming step of forming the rib by pressing the film using concave and convex molds.

The rib may have a width of 0.5 to 3 mm and a height of 0.5 to 3 mm.

In the rib forming step, the rib may be formed without heating.

In the cured portion forming step, the film may be cooled by molds, whose shape corresponds to the shape of the cured portion, abutting both surfaces of the film, and a roughening processing may be performed on an outer surface of the cured portion of the film by using a mold having an abutting surface which abuts an outer surface of the film and on which a sandblast processing is performed.

The manufacturing method may further include a step of providing an opening assisting line which intersects the rib.

The present invention provides a package bag including: a spout which is defined by a pair of flow passage forming sealing portions which are formed by sealing two films at both side portions of a flow passage; a groove rib which is formed so as to protrude outward of the film and extend along the flow passage; and a cured portion which is formed on at least one side of the rib by crystallizing at least a portion of a resin constituting the film.

The rib may have a width of 0.5 to 3 mm and a height of 0.5 to 3 mm.

The package bag may further include an opening assisting line which is provided so as to intersect the rib.

An outer surface of the cured portion of the film may be roughened.

The film may be formed in a substantially rectangular shape; among the pair of flow passage forming sealing portions, one flow passage forming sealing portion may be provided on a first side of the film, and the other flow passage forming sealing portion may be provided on a second side of the film adjacent to the first side; and at least one of the ribs may be disposed on an intersection point between a line passing through a position of the flow passage forming sealing portion on the first side which is the closest to a third side opposite to the first side and extending substantially parallel to the third side, and a line passing through a position of the flow passage forming sealing portion on the second side which is the closest to a fourth side opposite to the second side and extending substantially perpendicular to the third side.

Advantageous Effects of Invention

According to the present invention, by providing the cured portion formed on one side or both sides of the groove rib, which is formed so as to protrude outward of the film and extend along the flow passage, by crystallizing at least a portion of resin constituting the film, it is possible to maintain an opening state of the spout. Further, since additional material is not required, it is possible to suppress increase in the thickness of the package bag and to reduce the bulkiness of the package bags.

DESCRIPTION OF EMBODIMENTS

Hereinafter, an embodiment of the present invention will be described with reference to the drawings.

Figure 1:
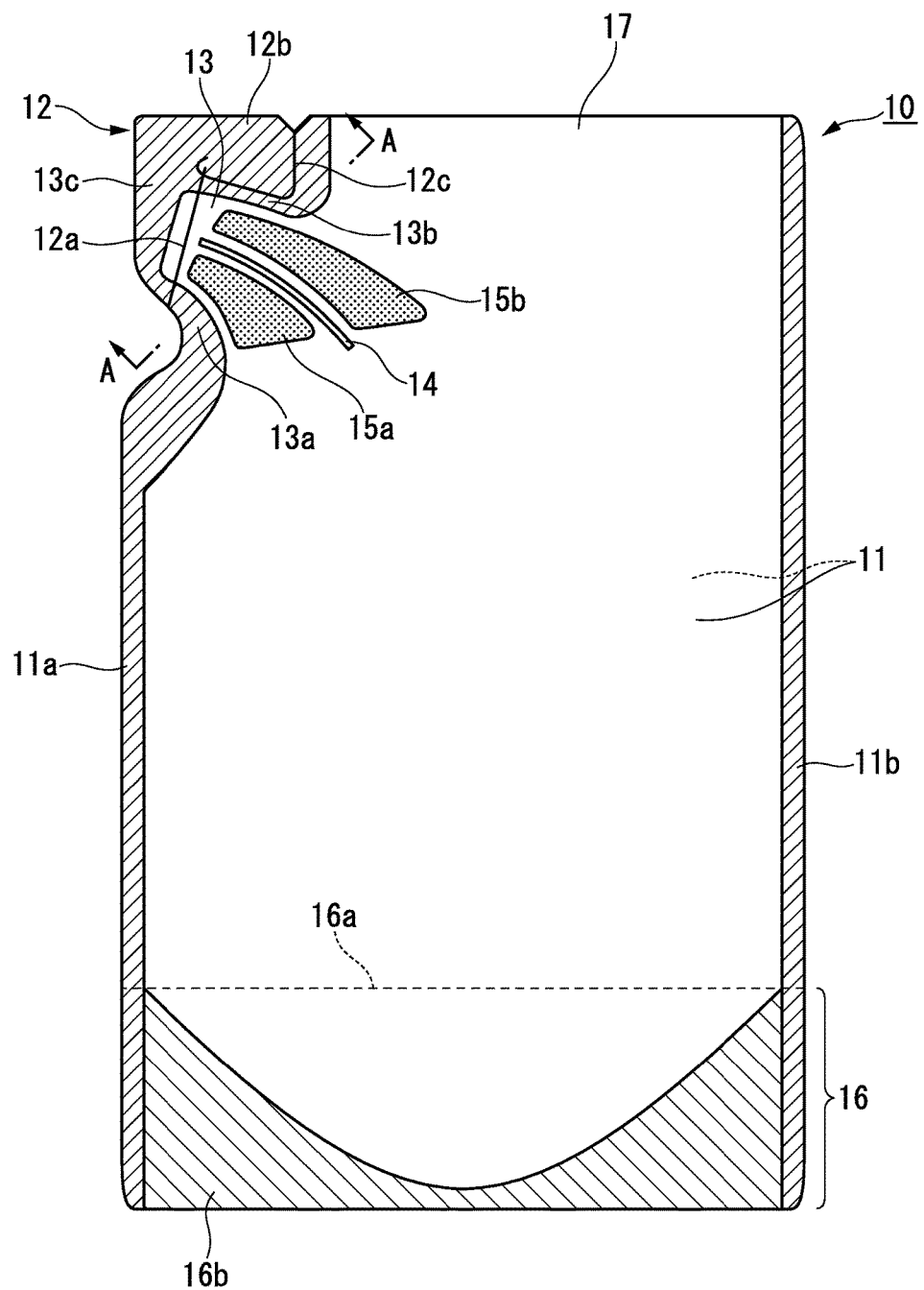
FIG. 1 is a front view showing an example of a package bag according to the present invention.
Figure 2A:
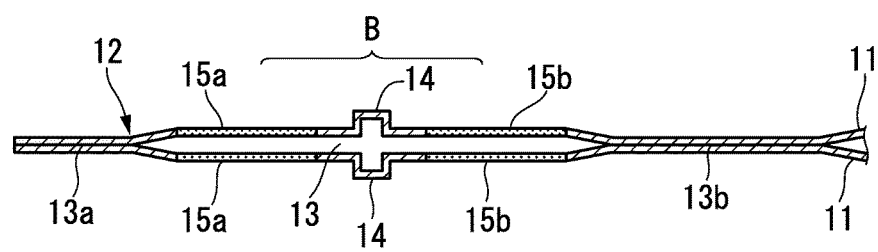
FIG. 2A is a sectional view taken along the line A-A in FIG. 1.
Figure 2B:
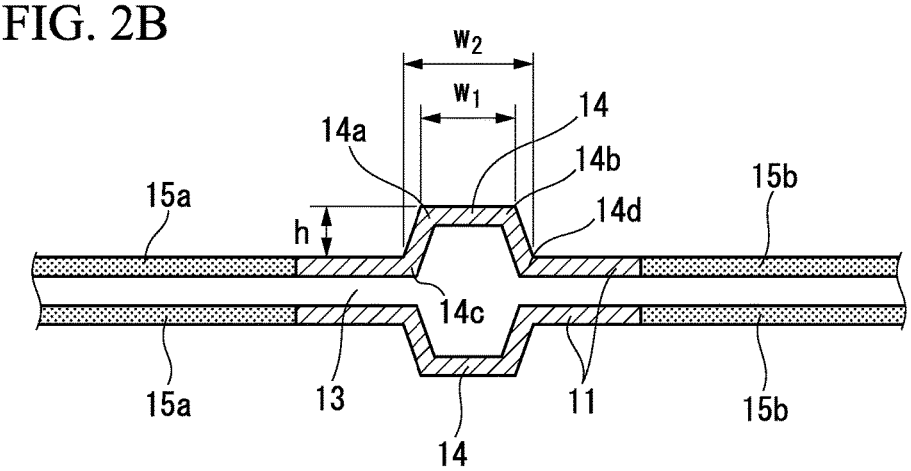
FIG. 2B is a partially enlarged view of a part B in FIG. 2A.

As shown in FIGS. 1, 2A and 2B, a package bag 10 according to the present embodiment is a standing pouch which is constituted by: two sheets of body films 11 and 11 having the same planar shape; and a bottom film 16 which is folded in half along a folding line 16a as a center line. As shown in FIG. 1, the bottom film 16 is folded in a state where the folding line 16a is disposed thereinside, and is interposed between lower portions of the pair of body films 11 and 11.

Note that an up-and-down direction on the paper in FIG. 1 is defined as a vertical direction in a state where the package bag 10 stands.

Side edge sealing portions 11a and 11b are formed in both side edge portions of the package bag 10, and a bottom sealing portion 16b is formed in a lower portion of the package bag 10 by heat-sealing lower edge portions of facing surfaces of the bottom film 16 and each of the body films 11 and 11.

A laminated film is used for forming the body film 11 and the bottom film 16. As the laminated film, a conventionally used film, for example, a film in which a film formed of biaxially-stretched polypropylene, biaxially-stretched polyamide, biaxially-stretched polyester, or the like may be used as a base film, and a polyolefin-based resin such as low-density polyethylene, linear low-density polyethylene, ethylene-vinyl acetate copolymer, or polypropylene may be laminated as a sealant layer on the base film, is used. As a method of manufacturing a laminated film, dry-laminating, extrusion-laminating, co-extruding, or the like may be used. In order to improve the adhesive strength, an adhesive agent, an anchor agent or the like may be disposed between the base film layer and the sealant layer. In this case, in order to improve the strength of the package bag, a plurality of base films may be laminated. Alternatively, in order to improve the barrier properties for gas or ultraviolet rays, a metallic foil such as an aluminum foil, a metal deposition layer, an inorganic deposition layer such as ceramic, ethylene-vinyl alcohol copolymer film or the like may be laminated.

The dimension of the package bag 10 is not particularly limited. However, it is preferable as a refill container to set the height of the package bag 10 to around 100 to 500 mm, the width (the maximum width between the both side edges) of the package bag 10 to around 70 to 300 mm, and the filled amount of the contents to around 100 to 5,000 $cm^3$.

As shown in FIG. 1, a spout 12 is provided in an upper corner portion of the package bag 10. The spout 12 has a flow passage 13 which extends diagonally above.

Figure 3A:
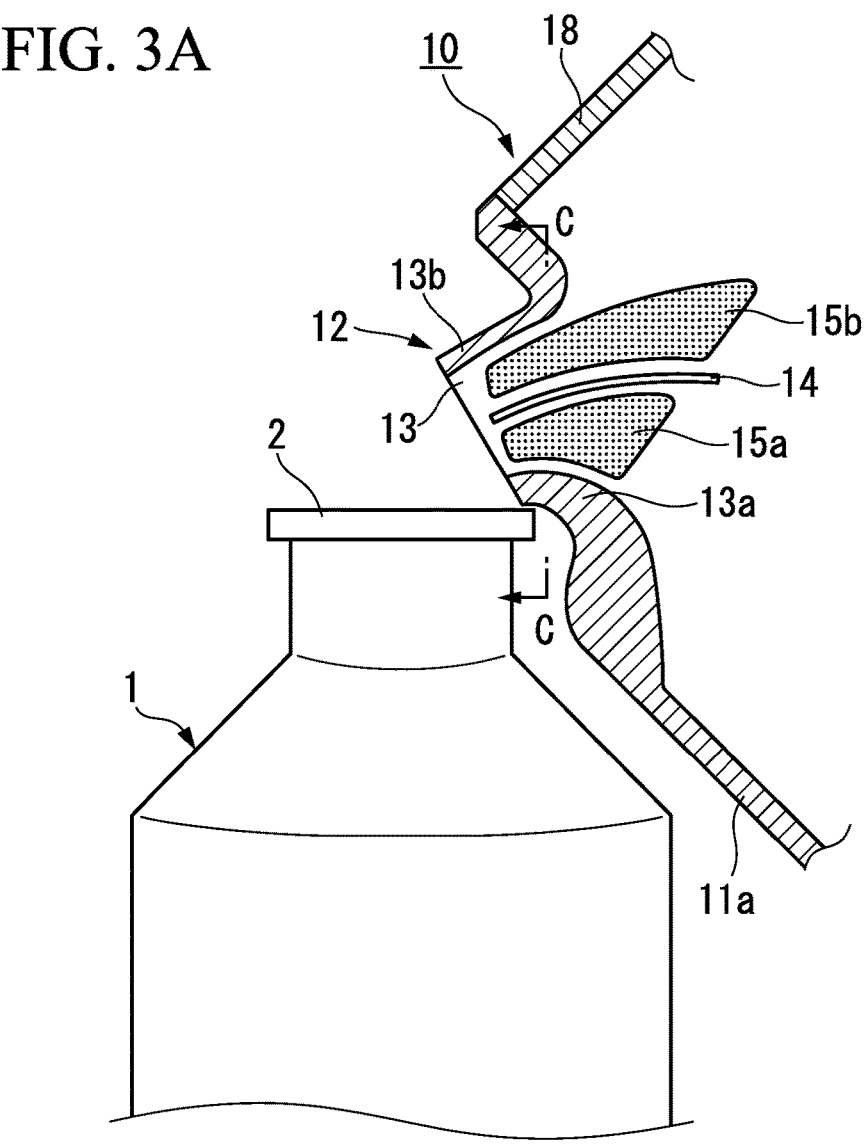
FIG. 3A is a front view showing an example of a state where the package bag shown in FIG. 1 is opened to spout liquid contents therefrom.

In the present embodiment, flow passage forming sealing portions 13a and 13b are formed by partially heat-sealing the body films 11 and 11 so as to continuously extend from an upper portion of the side edge sealing portion 11a. As shown in FIG. 3A, the flow passage forming sealing portions 13a and 13b define both side portions of the flow passage 13 when the tip end portion of the spout 12 is removed to open the flow passage 13. That is, the flow passage 13 of the spout 12 is formed by an unsealed portion between one flow passage forming sealing portion 13a and the other flow passage forming sealing portion 13b.

The tip end portion of the flow passage 13 is closed by a close sealing portion 13c. A filling opening 17 is opened between the flow passage forming sealing portion 13b and the side edge sealing portion 11b, and the contents are filled into the package bag 10 through the filling opening 17. After filling the contents, the filling opening 17 is closed by heat-sealing the body films 11 and 11 at circumferential edges of the filling opening 17 to form an upper sealing portion 18 (refer to FIG. 3A).

In order to easily open the spout 12, an opening assisting line 12a which is made of, for example, a half cut groove which intersects the flow passage 13 and is formed by a laser, a tub (grip) 12b which is formed in one edge side of the opening assisting line 12a by a cut-out line (penetration cutting) 12c, and the like may be provided in the spout 12.

Figure 8:
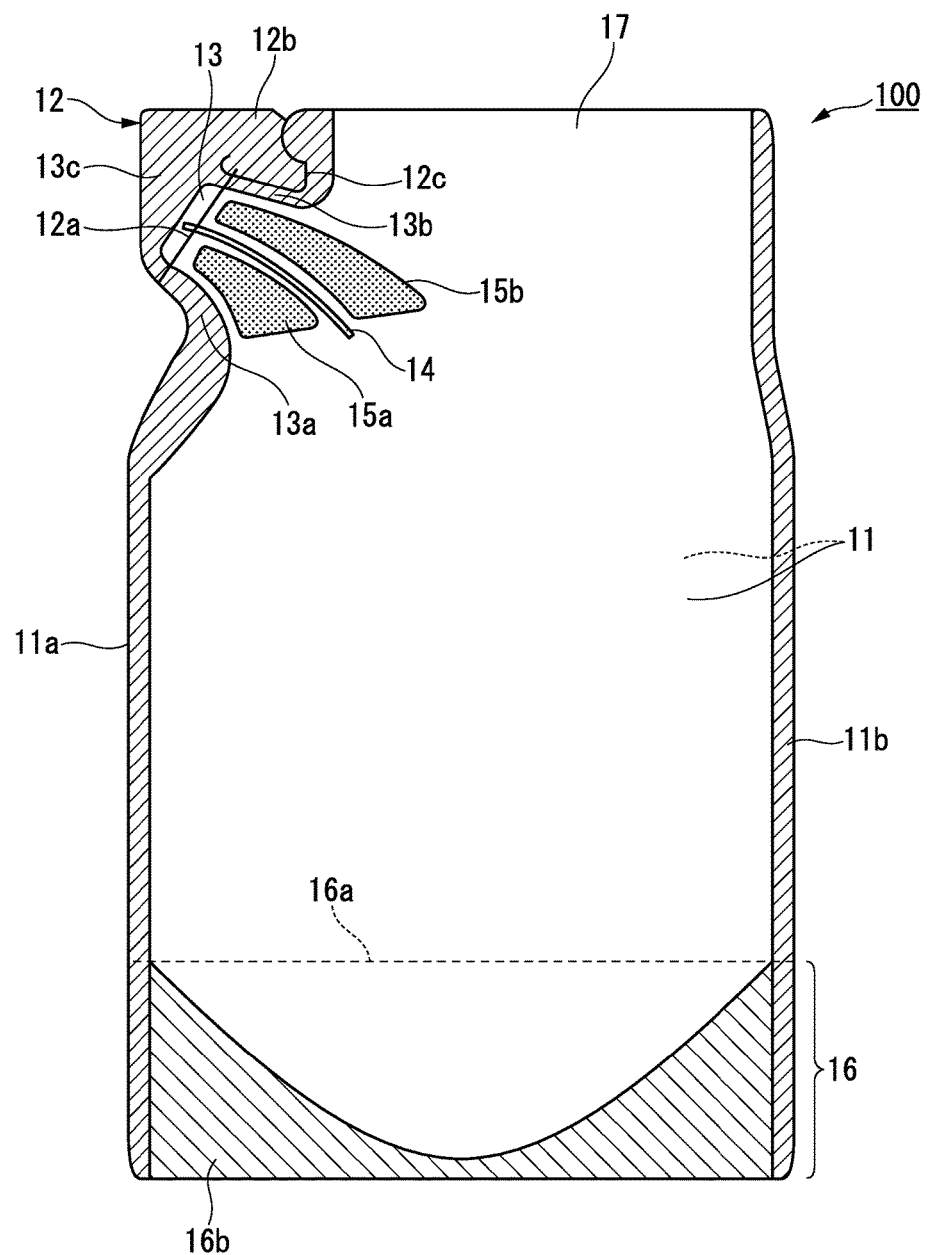
FIG. 8 is a front view showing an example of a state where an opening assisting line which intersects the rib is provided in the package bag according to the present invention.

Further, as shown in a package bag 100 in FIG. 8, if the opening assisting line 12a is provided so as to intersect a rib 14 (described later), since the rib 14 is also cut at the time of opening, the rib 14 is included in a cut surface. Therefore, it is possible to easily maintain an opening state of the flow passage 13 after opening. Note that in the package bag 100 shown in FIG. 8, the same constituent elements as those of the package bag 10 shown in FIG. 1 are designated by the same reference numerals.

In order to prevent the opening assisting line 12a from accidentally tearing in an unused state by getting caught by the tub 12b, it is preferable to provide one or more uncut portions (not shown) in the cut-out line (penetration cutting) 12c. The width of the uncut portion is set depending on the material of the body film 11. However, the width of the uncut portion may be set to around 0.5 to 1.5 mm in order to easily tear the uncut portion in hands at the time of opening.

The package bag 10 according to the present embodiment is provided with: the groove rib 14 which is formed along the flow passage 13 of the spout 12 by outwardly protruding a portion of the film 11; and cured portions 15a and 15b which are formed in both sides of the rib 14 by crystallizing at least a portion of resin constituting the film 11.

As shown in FIG. 2B, the rib 14 is formed by providing a plurality of linear deformations 14a, 14b, 14c, and 14d in the film 11, processing the film 11 in a groove shape along the linear deformations 14a, 14b, 14c, and 14d, and making creases to the folded portions. The rib 14 and the linear deformations 14a, 14b, 14c, and 14d of the rib 14 are formed by performing pressing processing on the film 11 by concave and convex molds. When viewing from the outside of the bag, the linear deformations 14a and 14b in the inner side are mountain folds, and the linear deformations 14c and 14d in the outer side are valley folds.

When forming the rib, it is preferable to apply pressure to the film without heating (for example, at a normal temperature of around 10 to 40 degree C.). By forming the rib without heating, since the fluidity of the resin constituting the film 11 is low, it is possible to easily form a fine rib 14. Further, it is possible to form a strong rib 14 which is hardly crushed since the creases of the linear deformations 14a, 14b, 14c, and 14d are reinforced.

In FIGS. 2A and 2B, the number of the linear deformations constituting one rib 14 is four. However, the number of the linear deformations may be two or three. It is preferable to set the width of the rib 14 to around 0.5 to 3 mm. It is preferable to set the height of the rib 14 to around 0.5 to 3 mm.

In the present invention, the width of the rib 14 means the distance between the linear deformations, among the plurality of linear deformations constituting one rib 14, which are most separated from each other. In FIG. 2B, the distance w2 between the linear deformations 14c and 14d in the outer side corresponds to the width of the rib 14. It is preferable to set the distance w1 between the linear deformations 14a and 14b in the inner side to be equal to or smaller than the distance w2.

The height h of the rib 14 corresponds to the depth of the groove in the inner surface side of the film 11. If only two linear deformations constitute one rib 14 (for example, refer to FIG. 2 in Patent Document 1: Japanese Unexamined Patent Application, First Publication No. H7-2260), the groove-shaped cross section can be formed by providing the liner deformations 14a and 14b of the mountain folds as the linear deformation, and bending the film 11 instead of providing the liner deformations 14c and 14d of the valley folds.

The cured portions 15a and 15b are formed by locally curing the film 11. The cured portion 15a is provided between the rib 14 and the flow passage forming sealing portion 13a, and the cured portion 15b is provided between the rib 14 and the flow passage forming sealing portion 13b. The cured portions 15a and 15b are disposed along the rib 14, and are planarly formed.

Figure 5:
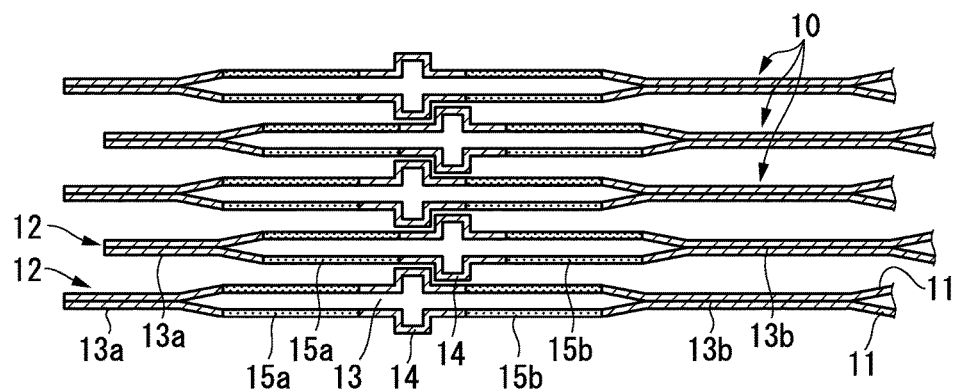
FIG. 5 is a partially sectional view of a spout and the vicinity thereof showing a state where the empty package bags according to the present invention are piled.

As a result, as shown in FIG. 2A, it is possible to make the spout 12 almost flat when the bag is empty. Further, as shown in FIG. 5, by piling some package bags 10 such that the positions of the ribs 14 are alternatively and slightly shifted, it is possible to reduce the bulkiness of the piled package bags 10.

There may be no gap between the rib 14 and the cured portions 15a and 15b. However, it is preferable to ensure some gap in order to tolerate some degree of positional error when the rib 14 is formed by press-molding an uncured portion between the cured portions 15a and 15b.

Figure 3B:
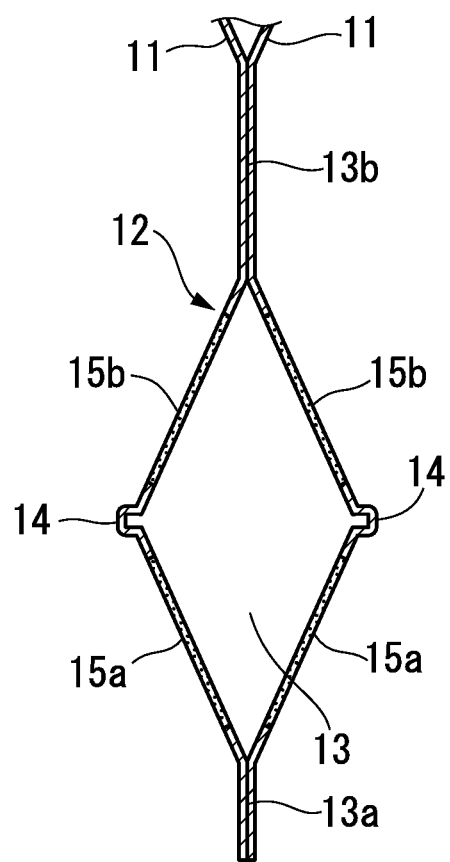
FIG. 3B is a sectional view taken along the line C-C in FIG. 3A.

Since the rib 14 is not cured, the rib 14 is bent more easily than the cured portions 15a and 15b. Therefore, when the package bag 10 is opened to spout the contents therefrom at the time of use, due to the weight of the contents, the cured portions 15a and 15b are separated from each other with the flow passage forming sealing portions 13a and 13b serving as a fulcrum, and the spout 12 is opened as shown in FIG. 3B. That is, the body films 11 and 11 are spread out so as to be bent outward of the package bag 10 in portions where the ribs 14 are formed.

Since the film 11 which forms the flow passage 13 includes the cured portions 15a and 15b, it is possible to maintain the opening state of the spout 12 even if the flow amount of the passing contents decreases. Further, since the rib 14 is provided at an approximately center of the flow passage 13, it is possible to increase the cross-sectional area of the opened flow passage 13.

As a result, it is possible to efficiently refill the contents from the package bag 10 to a container 1 by directing (or inserting) the opened spout 12 to an inlet 2 of the container 1 as shown in FIG. 3A.

As shown in FIG. 3A, if an outer edge shape of the flow passage forming sealing portion 13a in the inlet 2 side protrudes toward a side surface of the inlet 2 by increasing the sealing width of the flow passage forming sealing portion 13a, it becomes easier to fit the position of the spout 12 to the inlet 2 by abutting the spout 12 on the side surface of the inlet 2. Alternatively, as shown in FIG. 8, the outer edge shape of the flow passage forming sealing portion 13a may be recessed so as not to make the flow passage forming sealing portion 13a abut the inlet 2.

In the present embodiment, it is preferable to form the cured portions 15a and 15b by performing heating and cooling process on the film 11 to crystallize at least a portion of the resin which constitutes the film 11. Alternatively, a method of locally applying ultraviolet curable resin to the film and curing the resin, or a method of adhering a molded piece to the film, may be employed as other methods of forming the cured portion. However, in the case of the present embodiment, since the material of the film 11 itself is cured, additional material is not required.

Crystalline polymer resin is known as resin which is capable of being crystallized by the heating and cooling process. The crystalline polymer resin has a high orderly molecular arrangement, and generally, has a small side chain of polymer chain. Further, when melt-forming the crystalline polymer resin, if the crystalline polymer resin is rapidly cooled to make it into a glass form, the transparency and the flexibility improve, but the crystallinity decreases. That is, the crystallinity of the crystalline polymer resin of the film 11 before forming the cured portions 15a and 15b is low. When a predetermined portion of the film 11 is heated to around the melting point (at least over the glass-transition temperature) and then is cooled by spending, for example, one minute or more, it is possible to locally enhance the crystallinity of the film 11, and it is thereby possible to form the cured portions 15a and 15b.

The known specific examples of the crystalline polymer resin include polyethylene, polypropylene, polyethylene terephthalate, and isotactic polystyrene. Among them, it is preferable to use resin whose melting point is less than 200 degree C., such as polyethylene (HDPE, MDPE, LDPE, or LLDPE) and polypropylene (CPP or OPP), as the material of the film 11 of the package bag 10, since it is possible to easily perform the crystallizing process when manufacturing the bag.

Figure 4:
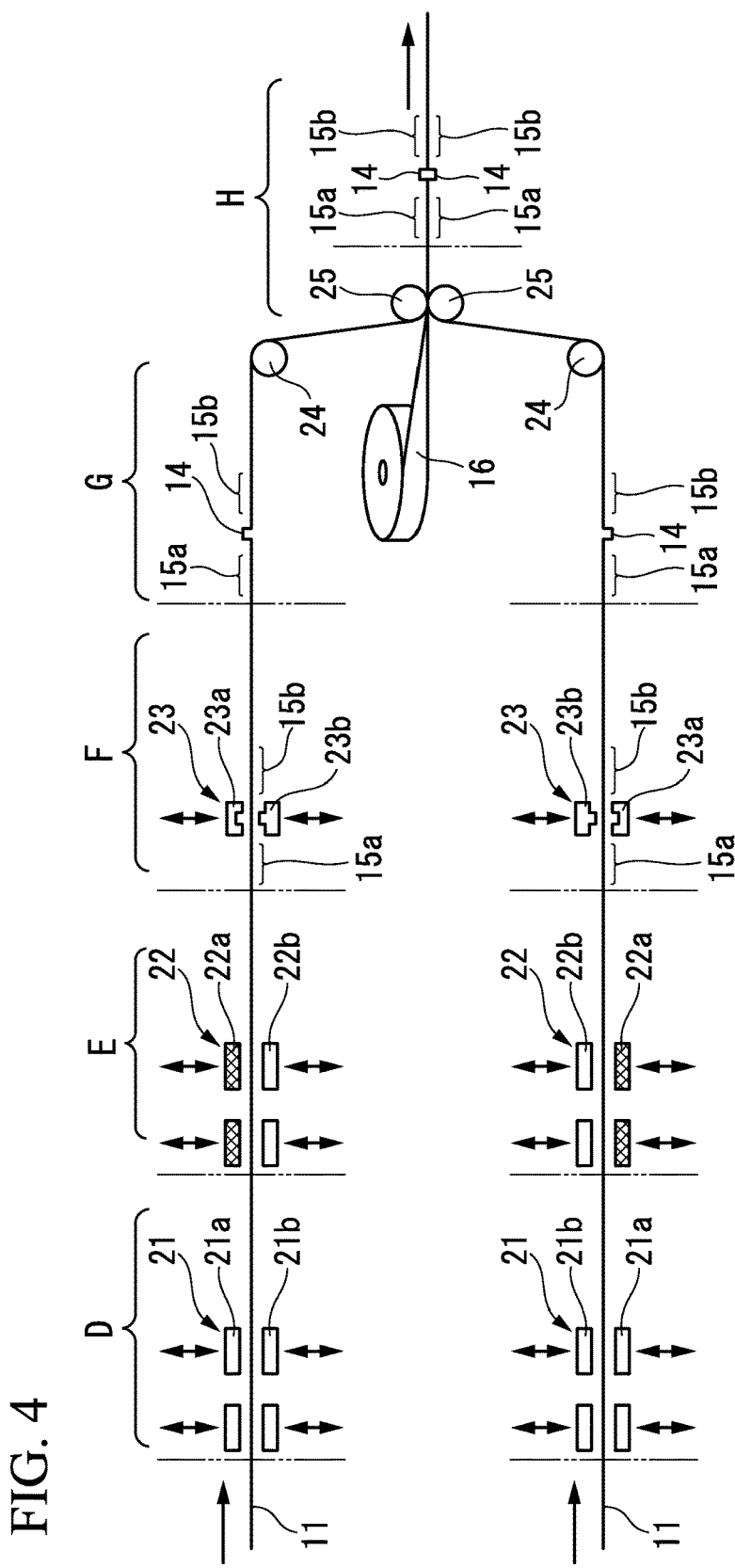
FIG. 4 is an explanation drawing of a step of forming a rib and cured portions in a film in a manufacturing method of a package bag according to the present invention.

FIG. 4 is an explanation drawing of a step of forming the rib 14 and the cured portions 15a and 15b in the film 11 when manufacturing the package bag 10 according to the present embodiment.

Regarding the order of a cured portion forming step and a rib forming step, the cured portion forming step may be performed first as shown in FIG. 4, or the rib forming step may be performed first.

<Cured Portion Forming Step>

As shown in a D-part in FIG. 4, the film 11 is locally heated on at least one side of a forming position of the rib 14 by means of a heater 21 including a pair of heating molds 21a and 21b. In order to identify the forming position of the rib 14 before forming the rib 14, it is preferable to put a marking and the like at an appropriate position on the film 11, and form the cured portions 15a and 15b using the marking as a standard.

Subsequently, as shown in an E-part in FIG. 4, the film 11 is locally cooled in the position which has been heated by the heater 21 in the D-part by means of a cooler 22 including a pair of cooling molds 22a and 22b.

By performing the heating and cooling process in this manner, it is possible to form the cured portions 15a and 15b by crystallizing at least a portion of the resin which constitutes the film 11.

The heating molds 21a and 21b and the cooling molds 22a and 22b are molds whose shape corresponds to the shape of the cured portions 15a and 15b, and abut both surfaces of the film 11.

Among the cooling molds 22a and 22b, it is preferable to roughen an abutting surface of the cooling mold 22a which abuts the outer surface of the film 11 through sandblast processing. As a result, it is possible to perform roughening processing on outer surfaces of the cured portions 15a and 15b of the film 11 by transferring the roughness of the mold to the outer surfaces of the cured portions 15a and 15b, and it is thereby possible to obtain an advantage such as preventing slipping. The sandblast processing is performed using, for example, a material having particles whose particle diameter is around #10 to 100, and an abutting surface whose surface roughness is around 1 to 100 μm. Note that the abutting surface of the cooling mold 22a may be roughened by other roughening processing than the sandblast processing.

<Rib Forming Step>

As shown in an F-part in FIG. 4, pressing processing is performed on the film 11 by means of a presser (concave and convex molds) 23 including a concave mold 23a and a convex mold 23b to form the rib 14 shown in a G-part in FIG. 4. As is described above, it is preferable to use the concave mold 23a and the convex mold 23b without heating. Note that it is acceptable that the thickness of the film 11 in the portion where the rib 14 is formed after the pressing processing is thinner than the thickness of the film 11 in the other portions. When the thickness of the film 11 in the portion where the rib 14 is formed is thin, the rib 14 can be easily bent.

<Bag Manufacturing Step>

The film 11, in which the cured portions 15a and 15b and the rib 14 have been formed at predetermined positions within an area where the spout 12 is to be formed, is delivered along rollers 24 and 25, and two films 11 are piled as shown in an H-part in FIG. 4. Further, the bottom film 16 folded in half is supplied between the body films 11 and 11. A bag manufacturing step is performed by using conventionally known methods.

For example, the package bag 10 is manufactured by forming sealing portions such as the side edge sealing portions 11a and 11b, the flow passage forming sealing portions 13a and 13b, and the bottom sealing portion 16b, and cutting it along the outer shape of the bag.

If a notch and the like are formed in the edge of the package bag 10, a cutter, a punching machine, or the like is used to respective package bag 10 after separation to form the notch and the like at a desired position. The notch and the like may be simultaneously formed when forming the outer shape of the package bag.

<Opening Assisting Line Forming Step>

The opening assisting line 12a is formed by half-cutting the film by, for example, irradiating a laser. If laser irradiation is performed so as to intersect the rib 14 as the package bag 100 in FIG. 8, the focus of the laser irradiation may be moved along a surface shape of the rib 14.

While the present invention have been explained based on a preferred embodiment, the invention is not to be considered as being limited by the foregoing embodiment, and various modifications can be made without departing from the scope of the present invention.

Figure 6:
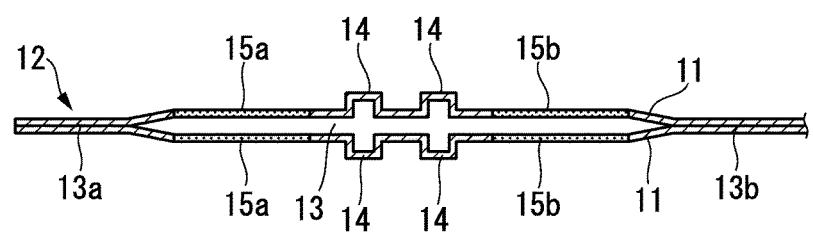
FIG. 6 is a partially sectional view of a spout and the vicinity thereof of a first modification example of the package bag according to the present invention.

In FIG. 1, an example of providing the cured portions 15a and 15b in the both sides of the rib 14 is described. However, the cured portion may be provided in only one side of the rib 14. In this case, it is preferable to provide the cured portion 15a at a position where the cured portion 15a is positioned under the rib 14 at the time of spouting as shown in FIG. 3A. Further, as shown in FIG. 6, a plurality of ribs 14 may be provided in rows in the one film 11.

Figure 7:
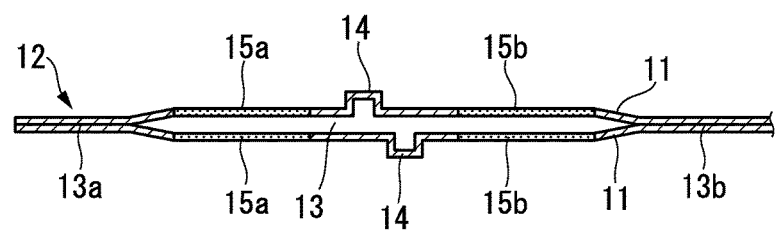
FIG. 7 is a partially sectional view of a spout and the vicinity thereof of a second modification example of the package bag according to the present invention.

Further, as shown in FIG. 7, the positions of the ribs 14 may be shifted on the front and back sides of the bag. By shifting the positions of the ribs 14 on the front and back sides of the bag, when piling some package bags 10, it is possible to reduce the bulkiness of the piled package bags 10 without alternatively shifting the positions of the package bags 10 as shown in FIG. 5

The flow passage 13 in FIG. 1 is curved toward the outside in the width direction of the package bag 10 (that is, toward the left in FIG. 1) such that the angle of the flow passage 13 with respect to the width direction of the package bag 10 closes to 0°, and the rib 14 is formed in an arc shape along the flow passage 13. However, the shape of the spout and the direction of the flow passage are not particularly limited and can be appropriately set in the viewpoint of easier spouting and manufacturing. For example, the flow passage of the spout may be straight. Alternatively, the tip end portion of the spout may protrude from one side of the package bag.

The bottom film 16 is not essential, and the present invention can be applied to a package bag constituted by a planar bag such as a three-side sealed bag or a four-side sealed bag.

Figure 9:
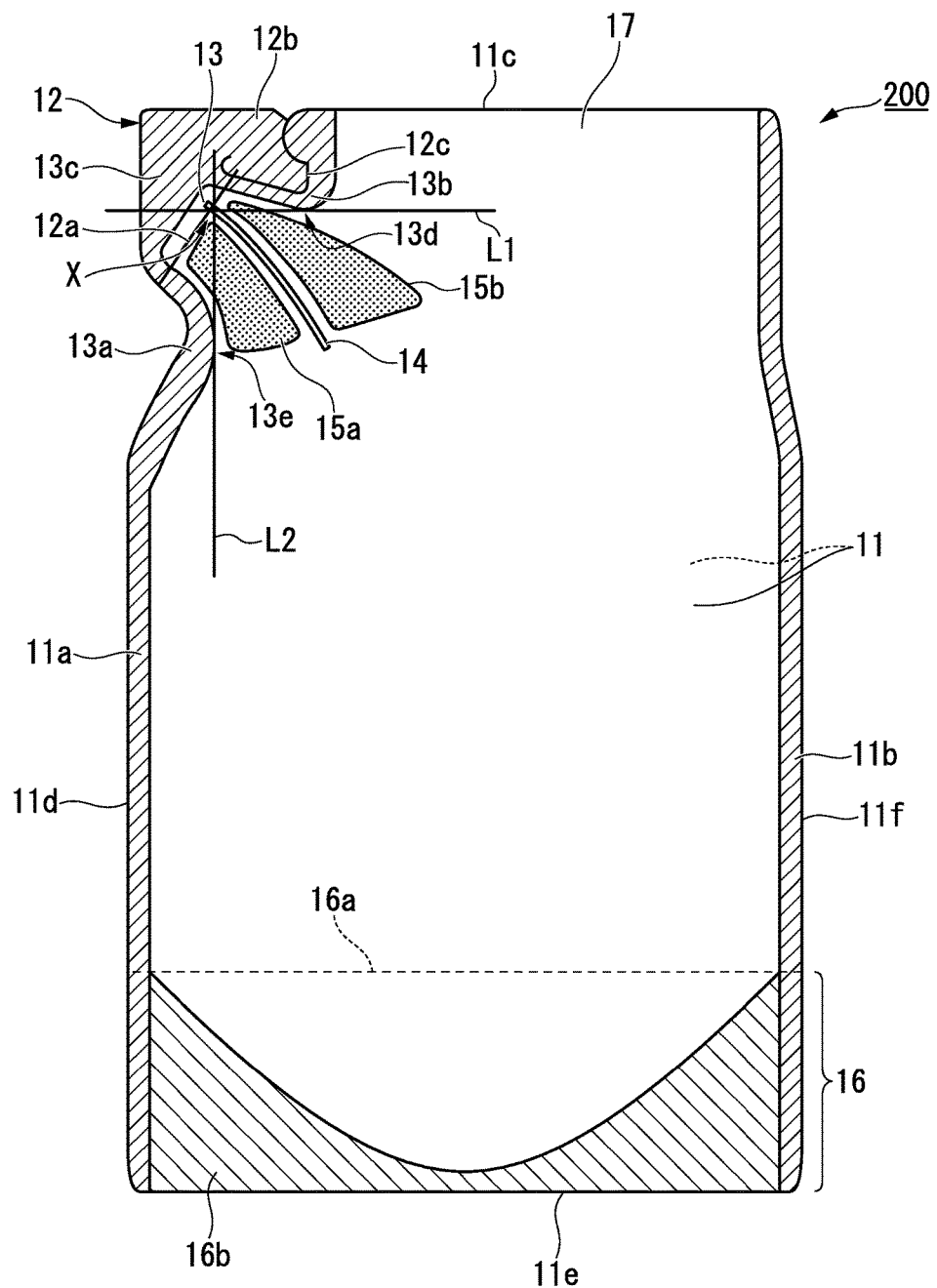
FIG. 9 is a front view showing an example of a state where the rib is disposed at a predetermined position in the package bag according to the present invention.

Further, as shown in a package bag 200 in FIG. 9, the rib 14 may be disposed at a predetermined position. Note that in the package bag 200 shown in FIG. 9, the same constituent elements as those of the package bag 10 shown in FIG. 1 are designated by the same reference numerals.

The body films 11 and 11 are formed in a substantially rectangular shape. Among the pair of flow passage forming sealing portions 13a and 13b, one flow passage forming sealing portion 13b is provided on a side of an upper side (a first side) 11c of the film 11, and the other flow passage forming sealing portion 13a is provided on a side of a lateral side (a second side) 11d adjacent to the upper side 11c of the film 11. At least one rib 14 is disposed on an intersection point X between a line L1 and a line L2, the line L1 passing through a position 13d of the flow passage forming sealing portion 13b which is the closest to a lower side (a third side) 11e opposite to the upper side 11c and extending substantially parallel to the lower side 11e, the line L2 passing through a position 13e of the flow passage forming sealing portion 13a which is the closest to the other lateral side (a fourth side) 11f opposite to the lateral side 11d and extending substantially perpendicular to the lower side 11e.

The spout 12 tends to occlude at a portion of the intersection point X between the line L1 and the line L2 when spouting the contents. In the package bag 200 shown in FIG. 9, since the rib 14 is disposed on the intersection point X, it is possible to prevent the occlusion of the spout 12, and to rapidly discharge the contents.

INDUSTRIAL APPLICABILITY

The present invention is suitably applied to a package bag in which fluid contents such as a liquid, powders, grains, or mixtures thereof, are filled.

REFERENCE SIGNS LIST 10, 100, 200: package bag
11: body film (film)
11a, 11b: side edge sealing portion
11c: upper side (first side)
11d: lateral side (second side)
11e: lower side (third side)
11f: lateral side (fourth side)
12: spout
12a: opening assisting line
13: flow passage
13a, 13b: flow passage forming sealing portion
14: groove rib
15a, 15b: cured portion

What is claimed is:

1. A manufacturing method of a package bag including: a spout defined by a pair of flow passage forming sealing portions which are formed by sealing two films at both side portions of a flow passage; a groove rib formed so as to protrude outward of the film and extend along the flow passage; and a cured portion formed on at least one side of the rib by crystallizing at least a portion of a resin constituting the film, the manufacturing method comprising:

a cured portion forming step of forming the cured portion on at least one side of a forming position of the rib by crystallizing at least a portion of the resin constituting the film by heating and cooling the film; and
a rib forming step of forming the rib by pressing the film using concave and convex molds without heating and crystallizing the rib,
wherein the cured portion forming step comprises a heating step of heating the film by a heater abutting the film at least over a glass-transition temperature of the film, and a cooling step of cooling the film by a cooler.

2. The manufacturing method of a package bag according to claim 1, wherein the rib has a width of 0.5 to 3 mm and a height of 0.5 to 3 mm.

3. The manufacturing method of a package bag according to claim 1, wherein
the heater has a pair of heating molds abutting and heating the film.

4. The manufacturing method of a package bag according to claim 1, wherein in the cured portion forming step, the film is cooled by a pair of molds of the cooler, whose shape corresponds to the shape of the cured portion, abutting both surfaces of the film, and a roughening processing is performed on an outer surface of the cured portion of the film by using a mold having an abutting surface which abuts an outer surface of the film and on which a sandblast processing is performed.

5. The manufacturing method of a package bag according to claim 1, further comprising a step of providing an opening assisting line which intersects the rib.

6. The manufacturing method of a package bag according to claim 2, wherein
the heater has a pair of heating molds abutting and heating the film.

7. The manufacturing method of a package bag according to claim 2, wherein
in the cured portion forming step, the film is cooled by a pair of molds of the cooler, whose shape corresponds to the shape of the cured portion, abutting both surfaces of the film, and a roughening processing is performed on an outer surface of the cured portion of the film by using a mold having an abutting surface which abuts an outer surface of the film and on which a sandblast processing is performed.

8. The manufacturing method of a package bag according to claim 3, wherein in the cured portion forming step, the film is cooled by a pair of molds of the cooler, whose shape corresponds to the shape of the cured portion, abutting both surfaces of the film, and a roughening processing is performed on an outer surface of the cured portion of the film by using a mold having an abutting surface which abuts an outer surface of the film and on which a sandblast processing is performed.

9. The manufacturing method of a package bag according to claim 2, further comprising a step of providing an opening assisting line which intersects the rib.

10. The manufacturing method of a package bag according to claim 4, further comprising a step of providing an opening assisting line which intersects the rib.

* * * * *